United States Patent [19]  [11] 4,444,017
Briccetti et al.  [45] Apr. 24, 1984

[54] METHOD AND APPARATUS FOR CONTROLLING THE OPERATION OF A COMPRESSOR CRANKCASE HEATER

[75] Inventors: Mario F. Briccetti, Liverpool; Wayne R. Reedy, Cazenovia, both of N.Y.

[73] Assignee: Carrier Corporation, Syracuse, N.Y.

[21] Appl. No.: 362,785

[22] Filed: Mar. 29, 1982

[51] Int. Cl.³ .................. F25B 43/02; F01M 5/00
[52] U.S. Cl. .................................. 62/84; 62/158; 62/193; 62/468; 184/6.22
[58] Field of Search .............. 62/84, 158, 157, 192, 62/193, 468, 469, 472, 231; 184/6.21, 6.22, 104 R, 6.23; 417/12, 13, 281, 228; 219/492, 493

[56] References Cited
U.S. PATENT DOCUMENTS

| 3,312,081 | 4/1967 | Berger et al. | 62/158 |
| 3,377,816 | 4/1968 | Berger | 62/192 X |
| 3,577,741 | 5/1971 | Shaw | 62/84 |
| 4,066,869 | 1/1978 | Apaloo et al. | 219/490 |
| 4,208,883 | 6/1980 | Stirling | 62/192 |
| 4,378,486 | 3/1983 | Yunik et al. | 219/492 |

Primary Examiner—Albert J. Makay
Assistant Examiner—Harry Tanner
Attorney, Agent, or Firm—Robert P. Hayter

[57] ABSTRACT

A method for controlling the energization of a crankcase heater for use in a refrigeration circuit is disclosed. The crankcase heater is energized through normally closed relay contacts except when the compressor is operating and except for a delay period after compressor operation. A microprocessor control is utilized to calculate the delay period based on the length of the period of compressor operation and to control the energization of the crankcase heater.

13 Claims, 4 Drawing Figures

METHOD AND APPARATUS FOR CONTROLLING THE OPERATION OF A COMPRESSOR CRANKCASE HEATER

BACKGROUND OF THE INVENTION

1. Field of the Invention

The present invention relates to a refrigeration circuit containing a refrigerant oil mixture. More specifically, this invention relates to a control for energizing a heater provided to raise the temperature of the lubricating oil for a compressor in a refrigeration circuit and in particular to a control for selectively energizing the heater in response to the operating conditions of the refrigeration system.

2. DESCRIPTION OF THE PRIOR ART

Air conditioners, refrigerators, heat pumps and other devices utilizing a refrigeration circuit produce a controlled heat transfer by the selective evaporation and condensation of refrigerant under varying temperature and pressure conditions. A compressor may be utilized to increase the temperature and pressure of gaseous refrigerant and to circulate that refrigerant through the refrigeration circuit. Typically, oil for lubrication of the compressor components is contained with the refrigerant within the refrigeration circuit.

It is well known, under certain conditions, that most refrigerants and oil used as a lubricant for the compressor of a refrigeration unit are freely miscible. During normal operation of the refrigeration circuit, because of the operating pressures and temperatures, the oil will be maintained in the sump of the compressor and will be substantially free of refrigerant. However, on shutdown when the circuit reaches ambient temperature, and the pressure equalizes within the circuit, refrigerant vapor and oil in the sump of the compressor will mix to form a substantially homogenous solution. This phenomenon becomes increasingly evident as the ambient temperature decreases.

Upon startup of the compressor, the oil sump which is usually a part of the crankcase of the compressor drops to suction pressure and the compressor mechanism may agitate the mixture of lubricating oil and refrigerant. A combination of the drop in suction pressure and possible mechanical agitation causes the refrigerant in solution with the oil to attempt to return to its gaseous state. Since the refrigerant at shutdown is in a substantially homogenous solution the flashing of the admixed liquid refrigerant to vapor may carry therewith a substantial amount of the oil charge and may even result in the entire solution turning into a foam.

Foaming of the oil will materially increase the amount of oil carried over into the refrigerant discharge line. Foaming may become so severe that all of the oil is pumped out of the sump. Not only will this leave the compressor without lubrication, which may produce excessive bearing wear and bearing failure in a very short period of operation, but there is also a possibility that noncompressible slugs of liquid refrigerant and oil will enter the compressor's cylinders and cause serious damage to the compressor in the form of broken valves and pistons and bent or broken connecting rods and shafts.

To avoid the problem of crankcase oil dilution with refrigerant crankcase heaters are generally employed. The heater may be an electrical resistance element and may be installed directly in the sump of the compressor in direct contact with the oil or may be wrapped about the outer surface of the compressor casing in heat transfer relation with the oil stored in the sump. The energization of the heater will maintain the lubricant at a satisfactory temperature above ambient, for example 40° F. to 60° F. above ambient. At this temperature, only a small amount of refrigerant will be absorbed by the oil charge.

Heretofore, it has been a practice within the industry to either maintain the heater energized at all times regardless of the operation of the refrigeration unit or the temperature of the ambient. Alternatively, it has been the practice to render the heater inoperable when a refrigeration unit is functioning and to energize the heater when the refrigeration unit has been shut down. Another practice has been to de-energize the crankcase heater when the ambient temperature is above a certain level or when the refrigeration unit is operating.

When a refrigeration system is operated, heat energy is stored in the compressor. This heat energy acts to maintain the refrigerant and oil separate for a certain time period after the compressor operation has been discontinued. The length of this time period has been found to be a function of the length of the period of operation of the compressor. Hence, in order to save energy it has been found to be efficient to operate the crankcase heater when the compressor is not operated and after the time period when the heat stored in the compressor during operation has been dissipated.

SUMMARY OF THE INVENTION

It is an object of the present invention to control a crankcase heater associated with the compressor of a refrigeration system to reduce mixing of refrigerant and lubricating oil.

A more specific object of the present invention is to provide apparatus for switching a crankcase heater on and off at the appropriate time to reduce energy consumption by operating the crankcase heater only when required.

It is a further object of the present invention to provide a method of determining when to energize and de-energize a crankcase heater.

It is a further object of the present invention to provide a safe, economical and efficient means of controlling the operation of a crankcase heater in a refrigeration circuit.

These and other objects of the present invention are achieved by providing a control for selectively energizing a heater provided to raise the temperature of the lubricating oil of a compressor employed in a refrigeration unit. A means for determining the run time of the compressor and the subsequent time interval wherein the heat energy stored in the compressor during the operating period acts to maintain the refrigerant and oil at a sufficiently high temperature to prevent mixing is utilized. The crankcase heater is de-energized whenever the compressor is operating or whenever the delay period after operation of the compressor has not expired. The crankcase heater is at all other times energized.

DESCRIPTION OF THE PREFERRED EMBODIMENT

The apparatus as described herein will refer to a heat pump system for use in a residential building incorporating a microprocessor control. It is to be understood that although the present crankcase heater control is incorporated within a microprocessor control the same function could be accomplished through mechanical or electromechanical means. The utilization of a microprocessor control herein serves many functions in addition to the crankcase heater control function set forth. It is further to be understood that although the present disclosure refers to a heat pump system that the utilization of a crankcase heater and a control therefor may be found in any equipment incorporating a refrigeration circuit therewithin.

Figure 1:
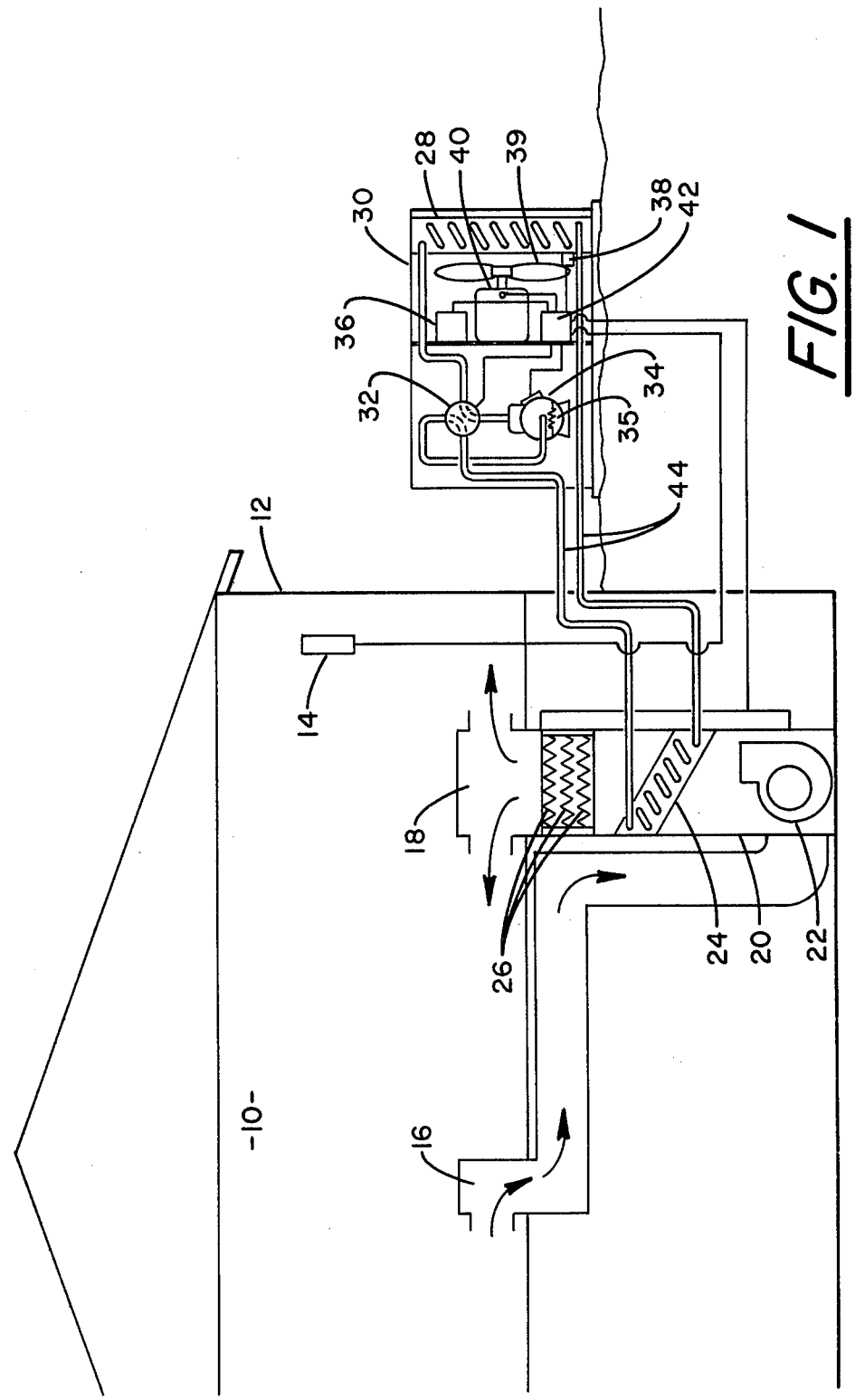
FIG. 1 is a schematic representation of a split heat pump system incorporated into a residential building.

Referring first to FIG. 1 there can be seen a schematic representation of a heat pump system. Residence 10 is shown having fan coil unit 20 located therein for circulating conditioned air within the house. Supply air duct 16 is shown directing air from the enclosure to fan coil unit 20 and return air duct 18 is shown for directing air from the fan coil unit back to the enclosure. Within the fan coil unit 20 may be seen indoor fan 22, indoor heat exchanger 24 and strip heaters 26. Indoor fan 22 acts to circulate the air through the supply duct, through the indoor heat exchanger and strip heaters and back through the return air duct to the enclosure. Indoor heat exchanger 24 is part of a refrigeration circuit and acts to either discharge heat to the air stream directed thereover via indoor fan 22 or to absorb heat energy therefrom. Strip heaters 26 are located downstream from indoor heat exchanger 24 and may be selectively energized to supply heat energy to the air stream flowing through the fan coil unit.

Outdoor unit 30 is shown located exterior of residence 10 and is typically mounted on a pad located adjacent thereto. Within outdoor unit 30 may be seen outdoor coil 28 of the refrigeration circuit, compressor 34 and reversing valve 32. Additionally, there can be seen outdoor fan 39 connected to outdoor fan motor 40 for circulating ambient air over outdoor coil 28. Outdoor temperature sensor 36, outdoor coil temperature senser 38, crankcase heater 35 and control 42 are also indicated to be within the outdoor unit. Likewise, thermostat 14 as well as electrical connections to strip heaters and the indoor fan motor for powering indoor fan 22 are designated.

The refrigeration circuit is made up of indoor coil 24, outdoor coil 28, compressor 34, reversing valve 32 and interconnecting piping 44. Expansion devices for accomplishing pressure drops between components of the refrigeration circuit are not shown.

During operation of this unit in the heating season, heat energy is absorbed in the outdoor coil 28 acting as an evaporator and discharged to indoor air via indoor heat exchanger 24 serving as a condenser. In the cooling mode of operation the reversing valve is switched such that hot gaseous refrigerant from the compressor is directed first to the outdoor coil 28 serving as a condenser and then directed to the indoor coil 24 serving as an evaporator for absorbing heat energy from the indoor air.

Figure 2:
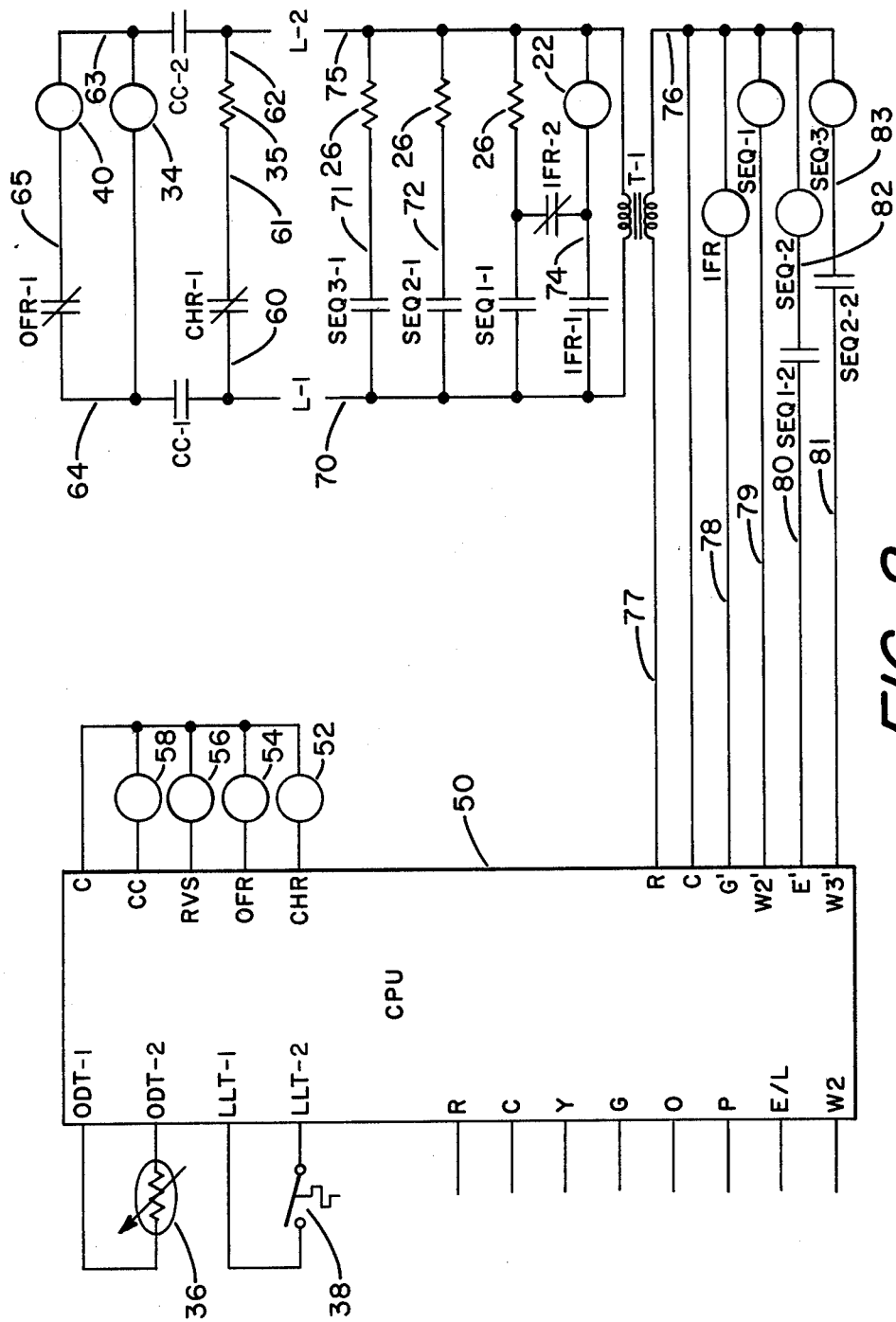
FIG. 2 is a schematic wiring diagram of the controls of the heat pump system.

Referring now to FIG. 2, there can be seen a schematic representation of the control system of this unit. In the left hand portion of FIG. 2 is shown, greatly enlarged, a central processing unit 50. Typically, this would be a commercially available microprocessor such as a Mostek 3870. It can be seen that the microprocessor has a plurality of inputs and outputs. Starting from the top left it can be seen that outdoor air temperature sensor 36 is connected through ODT-1 and ODT-2 to the central processing unit. Additionally, outdoor coil temperature sensor 38 is shown connected to the CPU through LLT-1 and LLT-2. Thereafter, a series of eight thermostat inputs labeled, R, C, Y, G, O, P, E/L and W-2 are shown entering the central processor unit. In sequential order, these thermostat inputs are as follows: R—Power to the thermostat from the CPU; C—Common; Y—First stage heating; G—Energize indoor fan relay; O—First stage cooling (reversing valve); P—Power to the central processing unit from the thermostat; E/L—Emergency heat or fault light; W-2—Second stage heat.

On the right hand side of the central processing unit there may be seen connections to various relays. Crankcase heater relay 52, outdoor fan relay 54, reversing valve solenoid relay 56 and compressor contactor 58 are all shown connected to the appropriate compressor, reversing valve solenoid, outdoor fan relay, and crankcase heater relay connections of CPU 50. The CPU is programmed such that upon an appropriate set of inputs being sensed these relays will be energized.

At the bottom right hand side of the central processing unit 50 there are shown six connection points labeled respectively R, C, G', W-2', E' and W-3'. In order, these connections are R—Power, C—Common, G'—Indoor fan relay W-2'—First stage heat, E'—Second stage heat and W-3'—Third stage heat. As can be seen in FIG. 2, the R connection is connected via wire 77 to one side of transformer T-1. The C connection is connected via wire 76 to the other side of transformer T-1. G' is connected via wire 78 to indoor fan relay IFR. Wire 79 connects W-2' to sequence relay SEQ-1. The E' terminal is connected via wire 80 to first sequence relay contacts SEQ1-2 which are connected by wire 82 to second sequence relay SEQ-2. Contact W-3' is connected via wire 81 to second sequence relay contacts SEQ2-2 which are connected by wire 83 to third sequence relay SEQ-3.

As shown in FIG. 2, lines L-1 and L-2 supply power to the fan coil unit and CPU. Line L-1, designated wire 70, is connected to normally open first sequence relay contacts SEQ1-1, normally open second sequence relay contacts SEQ2-1, to normally open third sequence relay contacts SEQ3-1, to normally open indoor fan relay contacts IFR-1 and to transformer T-1. Line L-2, designated as 75, is connected to heaters H1, H2 and H3, all designated as 26, to transformer T-1 and to indoor fan motor 22. Wire 71 connects normally open third sequence relay contacts SEQ3-1 to heater H3. Wire 72 connects normally open second sequence relay contacts SEQ2-1 to heater H2. Wire 73 connects normally open first sequence relay contacts SEQ1-1 to heater H1 and to normally closed indoor fan relay contacts IFR-2. Wire 74 connects normally open indoor fan relay contacts IFR-1 and normally closed indoor fan relay contacts IFR-2 to indoor fan motor 22.

Power wiring of the outdoor unit may be seen in the top portion of FIG. 2. Therein connected between power lines L-1 and L-2 is wire 60 connected to normally open compressor contacts CC-1 and to normally closed crankcase heater relay contacts CHR-1. Wire 61 connects normally closed crankcase heater relay contacts CHR-1 with crankcase heater CCH (35). Crankcase heater 35 is connected via wire 62 to line L-2 and to normally open compressor contactor contacts CC-2. Wire 64 connects normally open compressor contactor contacts CC-1 to normally closed outdoor fan relay contacts OFR-1 and to compressor motor 34. Wire 65 connects normally closed outdoor fan relay contacts OFR-1 to outdoor fan motor 40. Normally open compressor contactor contacts CC-2 are connected via wire 63 to compressor motor 34 and to outdoor fan motor 40.

Figure 3:
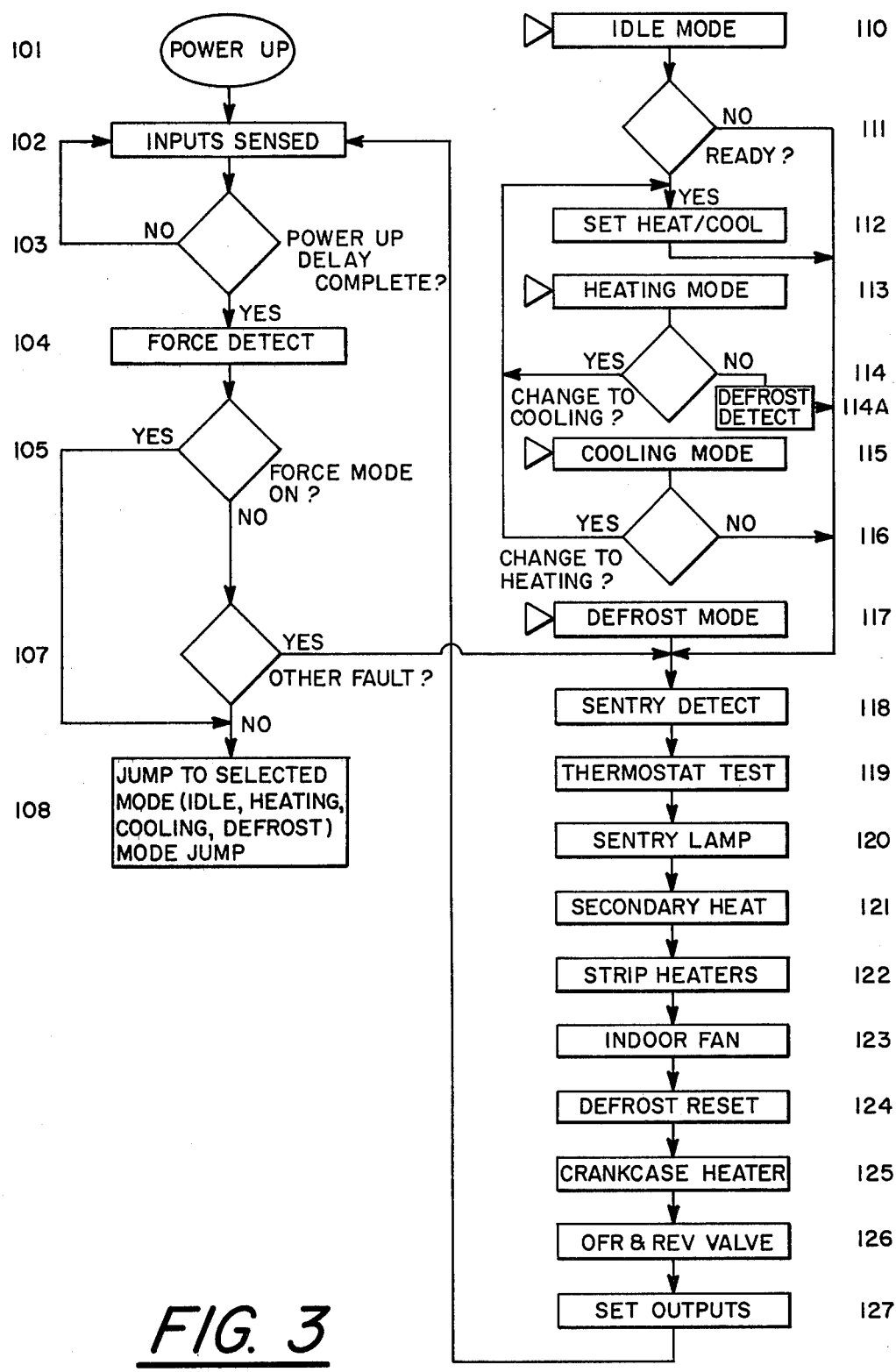
FIG. 3 is a flow diagram of a summary of the operation of a microprocessor control for the heat pump system.

FIG. 3 is a flow chart indicating the overall operation of the control system. It can be seen that the overall system control is obtained by logic flow through a series of logic steps. Each logic step may represent a subroutine or series of steps omitted for clarity in this overall chart. The initial step 101 is the powerup of the unit upon energization. Thereafter at step 102 the various inputs are sensed. To make sure the inputs are stabilized and debounced a powerup delay occurs before proceeding to force detect step 104. If the powerup delay is not complete then there is a reversion to the step of sensing inputs until said delay is accomplished. Force detect, step 104, determines whether or not the compressor is operating when it is not supposed to be. This step would detect a condition such as a contactor welded closed energizing the compressor when the various inputs are calling for the compressor to be deenergized. Step 105 determines whether the force mode is detected. If the force mode is detected then the program skips to step 108 wherein the logic jumps to the selected mode. If, in step 105, the force mode is not detected then the logic proceeds to step 107. At step 107 there is a determination whether there is another fault in the system. If there is no other fault the logic proceeds to step 108, the jump to the selected mode, one of the modes of idle, heating, cooling or defrost. If another fault is detected then the control logic jumps to step 118, sentry detect.

If in step 108 the jump is selected to the idle mode then the logic proceeds to step 110. Thereafter, at step 111, a ready determination is made and if the answer is no the logic jumps to step 118 without placing the unit in heating or cooling. If the answer to step 111 is yes the logic proceeds to step 112 and the air conditioning unit is placed in heating or cooling in step 112. The logic then jumps to step 118.

If the jump to the selected mode selects the heating mode then the jump is made to step 113. Once operation is in the heating mode the question of should operation be changed to cooling is continually answered at step 114. If the answer is yes, the logic is cycled back to step 112 of setting the unit in heat or cool and if the answer is no logic operation proceeds to step 114A, defrost detect. If a need for defrost is detected the logic changes the mode from heating to defrost and then jumps to step 118. If a need for defrost is not detected the logic does not change the mode and then jumps to step 118.

If in step 108 the selection is the cooling mode then the logic proceeds to step 115. Step 116 continually questions if operation should be changed to heating. If the answer is yes the control sequence proceeds back to the step 112 of setting the unit for heating or cooling. If the answer is no the logic jumps to step 118.

The fourth mode jump is to the defrost mode, step 117. This step in the logic either continues or cancels the defrost mode of operation. If the jump is made to the defrost mode thereafter the logic proceeds through the entire control sequence. From the defrost mode the control sequence includes the steps of sentry detect 118, thermostat test 119, sentry lamp 120, secondary heat 121, strip heaters 122, indoor fan 123, defrost reset 124, crankcase heater 125, OFR plus REV valve 126 and set outputs 127. From the step of set outputs 127 the control sequence reverts to step of inputs sensed (102).

The sentry detect step acts to check the compressor for low current or for ground fault indication. The thermostat test checks to make sure the inputs from the thermostat are in a legal pattern. The sentry lamp step acts to blink a thermostat lamp to indicate various fault modes. Secondary heat controls the W-2 output from the central process unit. The step of strip heaters 122 control the E' and W-3' outputs from the central processing unit. Indoor fan step 123 controls indoor fan 22. Defrost reset determines when a defrost timer for controlling the length of defrost needs to be reinitialized. Crankcase heater, step 125, acts to control the crankcase heater operation. OFR plus REV valve, step 126, acts to control the outdoor fan relay and the reversing valve relays under the appropriate conditions. Step 127 for setting the outputs turns on and off the central processing unit outputs and detects when the compressor is changing state.

Figure 4:
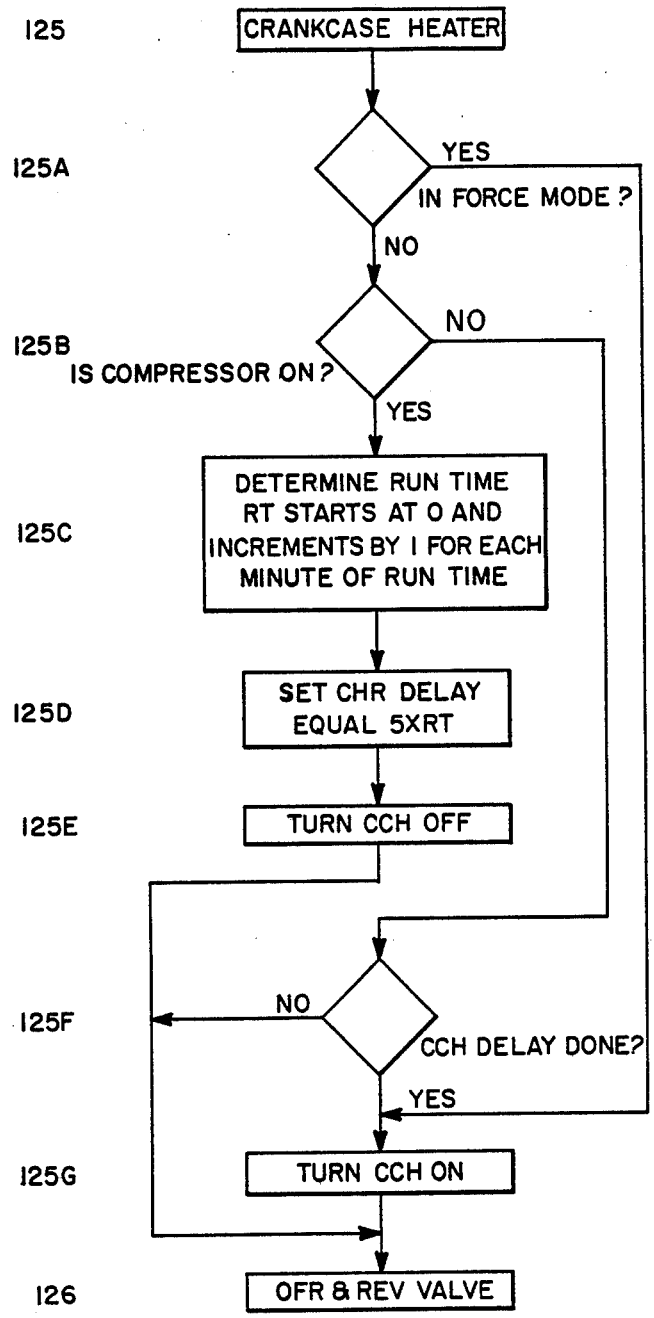
FIG. 4 is a flow chart of the crankcase heater control function accomplished by the microprocessor.

Referring more specifically to FIG. 4, there can be seen a flow chart for a specific subroutine to operate the crankcase heater. Therein there can be seen that the crankcase heater step 125, is shown having substeps 125A through 125G before proceeding to the OFR plus REV valve step 126. It can be seen therein step 125A questions whether the system is in the force mode. If the system is in the force mode it proceeds to turn the crankcase heater on. If the compressor is not in the force mode the logic proceeds to step 125B to determine whether the compressor is energized. If the compressor is not energized then the logic proceeds to step 125F to determine if the crankcase heater delay is accomplished. If the crankcase heater delay is accomplished then sequential operation turns the crankcase heater on at step 125G. If the crankcase heater delay is not completed sequential operation proceeds to step 126.

If the crankcase compressor is on as determined by step 125B then a calculation is made to determine a run time value RT. RT is determined by decrementing from five to zero in one unit increments for each one minute interval of continuous operating time of the compressor. The step 125B then calculates a crankcase heater delay by multiplying five times the quantity of five minus the run time. This calculation determines the total delay during which it is not necessary to operate the crankcase heater. Hence, if the compressor were run for a total of three minutes then step 125C would calculate the run time as two. Step 125 would then calculate that five times five minus two (or three) equals fifteen. It would be this fifteen minutes that is then utilized as the crankcase heater delay. Step 125E indicates that the crankcase heater is de-energized when the compressor is energized. Upon completion of the crankcase heater delay the crankcase heater is turned on at step 125G by step 125F determining the delay is completed.

As can be seen from the flow chart the crankcase heater is maintained in an energized state at all times except when either the compressor is operating or for a delay period after the compressor has operated, said delay period being calculated to equal five minutes for each one minute of compressor operation time up to a maximum of twenty-five minutes. Hence, if the compressor operates for five minutes, the crankcase heater delay, upon termination of compressor operation, is twenty-five minutes.

The above description sets forth a control scheme for regulating a crankcase heater using a central processing unit. As may be seen from the flow charts of FIGS. 3 and 4, the crankcase heater relay 52 which controls crankcase heater relay contacts CHR-1 for determining when to energize and de-energize crankcase heater CCH or 35 is controlled via the central processing unit 50 output CHR. As shown in FIG. 4, steps 125E and 125G determine when the crankcase heater should be turned on and off. Since the crankcase heater contacts CHR-1 are normally closed the operative step to de-energize crankcase heater CCH will be the energization of crankcase heater relay CHR.

The above-described control, wiring schematic and flow charts disclose a method and apparatus for controlling the crankcase heater of a refrigeration system. The crankcase heater is maintained energized except during operation of the compressor or except for a certain delay period after compressor operation. The delay period is a function of the duration of the compressor operation period and the heat energy stored within the compressor during the period of operation.

The invention has been described with reference to a particular embodiment thereof. It is to be undertsood by those skilled in the art that modifications and variations can be effected within the spirit and scope of the invention.

What is claimed is:

1. A method of regulating the operation of a crankcase heater for supplying heat energy to lubricating oil contained within a refrigerant compressor which comprises the steps of:
    sensing if the compressor is operating;
    detecting the length of the time period of continuous compressor operation; and
    energizing the crankcase heater except when the step of sensing ascertains the compressor is operating and except for a delay period after compressor operation, the length of said delay period being a function of the length of the time period of compressor operation ascertained by the step of detecting.

2. The method as set forth in claim 1 wherein the step of energizing the crankcase heater includes connecting the crankcase heater in series with normally closed relay contacts and a power source and wherein the exceptions to the step of energizing include energizing a relay to open the normally closed relay contacts thereby de-energizing the crankcase heater.

3. The method as set forth in claim 1 wherein compressor operation is controlled by a programmed central processing unit and wherein the steps of sensing and detecting are accomplished within said processing unit.

4. The method as set forth in claim 3 wherein the delay period during which the crankcase heater is not energized after compressor operation is calculated by sloving the equation: Delay $=5 \, X \, (RT)$ where RT is the run time of the compressor ascertained by the step of detecting in one minute increments.

5. The method as set forth in claim 4 wherein the step of energizing includes a maximum delay period of twenty-five minutes.

6. A method of controlling the operation of a crankcase heater for supplying heat energy to a refrigerant-lubricating oil mixture associated with a compressor of a vapor compression refrigeration system which comprises the steps of:
    connecting the crankcase heater to a power supply to provide heat energy to the mixture;
    operating the compressor to effect heat transfer upon the detection of a heat transfer need;
    interrupting the step of connecting the crankcase heater to de-energize the crankcase heater when the compressor is operating;
    interrupting the step of connecting the crankcase heater to de-energize the crankcase heater for a delay period after operation of the compressor; and
    calculating the length of the delay period based on the length of the period of operation of the compressor.

7. The method as set forth in claim 6 wherein the step of interrupting the step of connecting includes opening normally closed relay contacts to de-energize the crankcase heater.

8. The method as set forth in claim 7 wherein a microprocessor is connected to control the relay operating the normally closed relay contacts and wherein said microprocessor detects compressor operation and calculates the delay period after compressor operation.

9. The method as set forth in claim 8 wherein the step of calculating the length of the delay period includes determining the run time of the compressor in one minute increments and solving the equation $$\text{delay} = 5 \, X \, (\text{run time})$$

to obtain the delay period in minutes.

10. The method as set forth in claim 9 wherein the step of calculating includes a maximum delay period of twenty-five minutes.

11. Apparatus for controlling the operation of a crankcase heater for supplying heat energy to the refrigerant oil mixture in a compressor of a refrigeration circuit which comprises:
    means for determining if the compressor is operating and generating a signal in response thereto;
    means for calculating a delay period after a period of compressor operation based upon the length of time the compressor was continuously operating and generating a signal in response thereto; and
    switch means for de-energizing the crankcase heater in response to either a signal generated by the means for determining or the means for calculating.

12. The apparatus as set forth in claim 11 wherein the means for calculating includes a programmed microprocessor and wherein the delay period is calculated by multiplying the run time of the compressor in minutes by 5.

13. The apparatus as set forth in claim 12 wherein the means for calculating includes a maximum delay period of 25 minutes.

* * * * *